US008974724B2

(12) United States Patent
Day et al.

(10) Patent No.: US 8,974,724 B2
(45) Date of Patent: Mar. 10, 2015

(54) ALUMINUM TITANATE BATCH COMPOSITIONS AND METHOD

(75) Inventors: John Paul Day, Layton, UT (US); Robert John Locker, Corning, NY (US); David Lambie Tennent, Campbell, NY (US); Christopher John Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 1715 days.

(21) Appl. No.: 11/605,642

(22) Filed: Nov. 29, 2006

(65) Prior Publication Data

US 2008/0125305 A1 May 29, 2008

(51) Int. Cl.
| C04B 35/478 | (2006.01) |
| F01N 3/022 | (2006.01) |
| C04B 35/622 | (2006.01) |
| C04B 38/00 | (2006.01) |
| C04B 111/00 | (2006.01) |

(52) U.S. Cl.
CPC ....... *C04B 35/478* (2013.01); *C04B 2235/5436* (2013.01); *F01N 3/0222* (2013.01); *C04B 35/62204* (2013.01); *C04B 2235/3218* (2013.01); *C04B 38/0006* (2013.01); *C04B 2235/3234* (2013.01); *Y02T 10/20* (2013.01); *C04B 2235/3418* (2013.01); *C04B 2235/3208* (2013.01); *C04B 2235/5409* (2013.01); *C04B 2111/00793* (2013.01); *C04B 2235/3217* (2013.01); *C04B 2235/3227* (2013.01); *C04B 2235/3213* (2013.01); *C04B 2235/77* (2013.01)
USPC .......................................................... 264/638

(58) Field of Classification Search
USPC .......................................................... 264/638
See application file for complete search history.

(56) References Cited

U.S. PATENT DOCUMENTS

| 4,295,892 | A | 10/1981 | Matsuhisa et al. ............. 501/120 |
| 4,327,188 | A | 4/1982 | Endo et al. .................... 501/134 |
| 4,476,236 | A | 10/1984 | Inoguchi et al. .............. 501/118 |
| 4,483,944 | A | 11/1984 | Day et al. ...................... 502/439 |
| 4,851,376 | A | 7/1989 | Asami et al. .................. 501/119 |
| 4,855,265 | A | 8/1989 | Day et al. ...................... 501/128 |
| 4,900,703 | A * | 2/1990 | Ono et al. ...................... 501/136 |
| 5,290,739 | A | 3/1994 | Hickman ....................... 501/128 |
| 5,346,870 | A | 9/1994 | Noguchi et al. ............... 501/136 |
| 5,679,292 | A | 10/1997 | Nisimura ......................... 264/37 |
| 5,773,377 | A * | 6/1998 | Harris et al. .................. 501/98.4 |
| 5,846,276 | A | 12/1998 | Nagai et al. ..................... 55/523 |
| 6,146,560 | A | 11/2000 | Behi et al. ..................... 264/37.1 |
| 6,620,751 | B1 * | 9/2003 | Ogunwumi .................... 501/134 |
| 6,849,181 | B2 | 2/2005 | Ogunwumi et al. |
| 6,942,713 | B2 | 9/2005 | Ogunwumi et al. |
| 7,112,294 | B2 | 9/2006 | Inada .......................... 264/37.3 |
| 7,132,066 | B2 | 11/2006 | Noguchi |
| 7,148,170 | B2 | 12/2006 | Sasaki et al. .................. 501/155 |
| 7,524,450 | B2 | 4/2009 | Marada et al. |
| 2004/0020846 | A1 | 2/2004 | Ogunwumi et al. ....... 210/510.1 |
| 2004/0092381 | A1 * | 5/2004 | Beall et al. .................... 501/134 |
| 2004/0115392 | A1 | 6/2004 | Miyakawa et al. |
| 2004/0151872 | A1 | 8/2004 | Makino ......................... 428/116 |
| 2005/0091952 | A1 * | 5/2005 | Ogunwumi et al. ............. 55/523 |

FOREIGN PATENT DOCUMENTS

| CN | 1874834 | 12/2006 |
| EP | 1 428 809 | 6/2004 |
| JP | S56-089844 | 7/1981 |
| JP | H08-119726 | 5/1996 |
| JP | S62-207758 | 9/1997 |
| JP | 2000-302533 | 10/2000 |
| JP | 2004-188819 | 7/2004 |
| JP | 2005-126317 | 5/2005 |
| JP | 2005-534474 | 11/2005 |
| JP | 2005-534597 | 11/2005 |
| JP | 2007-510615 | 4/2007 |
| WO | 2004-011124 | 2/2004 |
| WO | WO 2004/011386 | 2/2004 |
| WO | 2005/030675 | 4/2005 |
| WO | WO 2005/046840 | 5/2005 |
| WO | WO 2006/015240 | 2/2006 |
| WO | 2006/028506 | 3/2006 |

OTHER PUBLICATIONS

Reed, James. Principles of Ceramics Processing. New York:John Wiley & Sons, INC, 1995. p. 583.*
JP Patent Application No. 2009-539270, Notice of Grounds for Rejection, May 29, 2012, pp. 1-2.
CN Patent Application No. 200780044329.6, Notice of the First Office Action, Nov. 17, 2011, pp. 1-3.

* cited by examiner

*Primary Examiner* — Joseph S Del Sole
*Assistant Examiner* — Russell Kemmerle, III
(74) *Attorney, Agent, or Firm* — Joseph M. Homa; Matthew B. McNutt

(57) ABSTRACT

Aluminum titanate precursor batch compositions comprising a recycled aluminum titanate component, at least a portion of the recycled aluminum titanate component being comprised of a recycled pre-reacted aluminum titanate composition or alternatively of an un-reacted green aluminum titanate precursor composition, and methods for producing aluminum titanate ceramic articles utilizing the inventive batch compositions.

22 Claims, No Drawings

ALUMINUM TITANATE BATCH COMPOSITIONS AND METHOD

BACKGROUND OF THE INVENTION

The present invention relates to ceramic articles, and more particularly to batch compositions and methods for producing ceramic articles comprised of a sintered phase aluminum titanate composition.

In diesel exhaust filtration, cordierite, being a low-cost material, in combination with offering low CTE, has been the material of choice. Porous cordierite ceramic filters of the wall-flow type have been utilized for the removal of particles in the exhaust stream from some diesel engines since the early 1980s. A diesel particulate filter (DPF) ideally combines low CTE (for thermal shock resistance), low pressure drop (for engine efficiency), high filtration efficiency (for removal of most particles from the exhaust stream), high strength (to survive handling, canning, and vibration in use), and low cost. Problems with cordierite include low volumetric heat capacity and low thermal conductivity which can result in unacceptably high temperatures during operation when the filters are regenerated under certain conditions, as well as low thermal durability. Further, inorganic particulates, known as ash, present in the diesel exhaust can react with cordierite and cause filter failures.

Aluminum titanate ceramic compositions have recently emerged as a viable alternative to the conventional cordierite ceramics due to their high volumetric heat capacity. Aluminum titanate is capable of forming ceramic articles of high, interconnected porosity and large median pore size, further combining high permeability, and being capable of employment in high temperature applications, such as diesel exhaust aftertreatment systems and diesel particulate filters. However, challenges surrounding the drying and firing of aluminum titanate precursor compositions make it difficult to obtain aluminum titanate ceramic filters with relatively high levels of porosity, tight dimensional tolerances, and crack-free filters following firing. While many approaches have been explored to increase the porosity of aluminum titanate, such as the addition of pore formers like potato starch and graphite, these approaches result in a decrease in the overall processing efficiency and corresponding increase in the material costs associated with the aluminum titanate production process.

Another challenge which exists in the production of aluminum titanate is the degree of deformation that occurs, like elephant's foot, during the firing process and that makes dimensional control an issue.

Still further, overall raw material costs associated with the inorganic aluminum titanate precursor compositions are significantly higher than those associated with conventional cordierite ceramics.

Therefore, for economical aluminum titanate production, there is a need in the art for ways of improving yields, reducing waste, and minimize the overall costs associated with the production of aluminum titanate ceramic compositions having the desired physical properties suitable for use in high temperature applications such as diesel particulate filtration systems.

SUMMARY OF THE INVENTION

The present invention is directed to aluminum titanate precursor batch compositions and methods for the production of aluminum titanate ceramic articles. In particular, at least a portion of the inventive batch compositions are formed from an amount of a recycled aluminum titanate component. In one aspect, the recycled component can comprise a green aluminum titanate precursor component. In another aspect, the recycled component can comprise a pre-reacted aluminum titanate ceramic material. These recycled components can, for example, be obtained from previously formed aluminum titanate green bodies and/or ceramic articles that have been deemed defective and unsuitable for use in the desired application.

The inventive batch compositions and methods can therefore provide several advantages, which address the challenges described above. For example, utilizing an amount of recycled material from previously discarded parts, whether an un-reacted green aluminum titanate or a reacted aluminum titanate ceramic, reduces the amount of waste produced. Until the discovery of the instant invention, discarded parts were typically sent to a landfill with costs associated therewith. In addition, the aluminum titanate raw materials are relatively expensive and so raw material cost as a whole goes up with each part that is discarded.

In another aspect, the incorporation of recycled material can enable a reduction in the amount of pore former required to obtain a ceramic article having a desired level of porosity. This can not only reduce costs associated with pore former addition, but can also enable a reduction in the length of the firing cycle which is typically dependent, at least in part, on the amount of pore former used.

Still further, in another aspect, pre-reacted aluminum titanate material can behave as a seed or nucleation site during the firing process. Thus, the use of pre-reacted aluminum titanate in the batch compositions of the present invention can enable a resulting plasticized ceramic precursor composition to be fired at a relatively lower firing temperature and/or reduce the firing time.

According to one aspect of the present invention, an aluminum titanate precursor batch composition is provided comprising an inorganic batch composition containing an alumina source, a silica source, and a titania source; at least one of a recycled aluminum titanate composition or green aluminum titanate precursor composition; and a sintering aid; an organic binder; and a liquid vehicle.

According to another aspect of the present invention, an aluminum titanate precursor batch composition is provided comprising an inorganic batch composition containing at least one of a recycled aluminum titanate composition or green aluminum titanate precursor composition; and a sintering aid; an organic binder; and a liquid vehicle.

In still another aspect, the present invention provides a method for producing a ceramic article comprised of a sintered phase aluminum titanate composition. The method generally comprises providing a plasticized aluminum titanate precursor batch composition as described herein; forming an extruded green body from the plasticized aluminum titanate precursor batch composition; and firing the formed green body under conditions effective to convert the aluminum titanate precursor composition into a ceramic composition comprising a sintered phase aluminum titanate.

Additional aspects of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION OF THE INVENTION

As briefly summarized above, in one aspect the present invention provides novel batch compositions suitable for use in forming a ceramic article comprised of a sintered phase aluminum titanate composition. Generally, the novel ceramic forming aluminum titanate precursor batch compositions comprise an inorganic powder batch, an organic binder and a liquid vehicle. If desired, one or more optional forming aids such as, for example, a sintering aid and/or a pore former can also be incorporated into the batch compositions.

At least a portion of the inorganic powder batch is formed of a recycled aluminum titanate component. In one aspect, the recycled aluminum titanate component is a green aluminum titanate precursor composition. Alternatively, the recycled aluminum titanate component is a recycled pre-reacted aluminum titanate composition. Still further, in another aspect, the recycled aluminum titanate component can comprise a combination of a green unreacted aluminum titanate composition and a pre-reacted aluminum titanate.

As used herein, a green aluminum titanate composition refers to a substantially dried, unreacted plasticized aluminum titanate precursor composition comprising an alumina source, a silica source, and a titania source. The green aluminum titanate composition can further comprise one or more optional forming aids such as, for example, a sintering aid and/or a pore former. Exemplary green aluminum titanate compositions include the un-reacted aluminum titanate forming precursor compositions disclosed in U.S. Pat. Nos. 4,483,944; 4,855,265; 5,290,739; 6,620,751; 6,942,713; 6,849,181; U.S. Patent Application Publication Nos.:2004/0020846; 2004/0092381; and in PCT Application Publication Nos.: WO 2006/015240; WO 2005/046840; and WO 2004/011386.

When used, the green aluminum titanate composition can be present in any desired amount, even comprising up to approximately 100 weight percent of the inorganic batch composition if necessary, although exemplary amounts of up to 25 weight percent and even up to 50 weight percent are more typically provided. Accordingly, in one aspect the inorganic batch composition consists essentially of a green aluminum titanate precursor composition. In still another aspect, the inorganic batch composition can comprises a green aluminum titanate composition in an amount in the range of from 1 to 50 weight percent of the inorganic batch composition.

The green aluminum titanate composition is preferably utilized in the batch composition as a particulate material. While the particulate green aluminum titanate composition can have any desired particle size, in one aspect it is preferred for the particulate green aluminum titanate to have a median particle size diameter in the range of from 10 µm to 50 µm, including exemplary median particle size diameters of 15 µm, 20 µm, 25 µm, 30 µm, 35 µm, 40 µm, and 45 µm.

As stated above, the recycled aluminum titanate component can alternatively comprise recycled pre-reacted refractory aluminum titanate. To this end, the pre-reacted aluminum titanate can also be present in any desired amount up to approximately 100 weight percent of the inorganic batch composition, although exemplary amounts from as low as 1 weight percent and up to 10, 15, 20, 25, 35, 45, or 50 weight percent are more typically employed. Accordingly, in one aspect the inorganic batch composition can consist essentially of a recycled pre-reacted aluminum titanate composition, i.e., an inorganic batch composition that consists essentially of 100% by weight of recycled pre-reacted aluminum titanate. In still another aspect, the inorganic batch composition can comprises pre-reacted refractory aluminum titanate in an amount in the range of from 1 to 25 weight percent of the inorganic batch composition.

When present, the pre-reacted refractory aluminum titanate composition is preferably utilized in the batch composition as a particulate material. While the particulate aluminum titanate composition can have any desired particle size, in one aspect it is preferred for the pre-reacted aluminum titanate to have a median particle size diameter in the range of from 8 µm to 55 µm, including exemplary median particle size diameters of 10 µm, 15 µm, 20 µm, 25 µm, 30 µm, 35 µm, 40 µm, 45 µm, 50 µm, and any ranges derived from these exemplary values.

In addition to the recycled aluminum titanate component, the inorganic powder batch composition can comprise raw inorganic aluminum titanate forming powder batch components, including an alumina source, a silica source, and a titania source.

Exemplary alumina sources can include aluminum oxides or a compound containing aluminum which when heated to sufficiently high temperature yields essentially 100% aluminum oxide. Non-limiting examples of alumina forming sources include corundum or alpha-alumina, gamma-alumina, transitional aluminas, aluminum hydroxide such as gibbsite and bayerite, boehmite, diaspore, aluminum isopropoxide and the like. Commercially available alumina sources can include relatively coarse aluminas, such as the Alcan C-700 series, having a particle size of about 4-6 micrometers, and a surface area of about 0.5-1 $m^2/g$, e.g., C-714 and C-701™. Relatively fine aluminas, having a particle size of about 0.5-20 micrometers, and a surface area of about 8-11 $m^2/g$, can also be used, such as A10 and A-16SG alumina, available from Almatis, Inc., Bauxite, Ariz. 72022 U.S.A. In still another aspect, the alumina forming source can be a colloidal alumina having particles sizes in the range of from 20 nm to 50 nm, such as the AL20 available from Nyacol Nano Technologies, Inc., Ashland, Mass. 01721, U.S.A.

If desired, the alumina source can also comprise a dispersible alumina forming source. As used herein, a dispersible alumina forming source is an alumina forming source that is at least substantially dispersible in a solvent or liquid medium and that can be used to provide a colloidal suspension in a solvent or liquid medium. In one aspect, a dispersible alumina source can be a relatively high surface area alumina source having a specific surface area of at least 20 $m^2/g$. Alternatively, a dispersible alumina source can have a specific surface area of at least 50 $m^2/g$. In an exemplary aspect, a suitable dispersible alumina source for use in the methods of the instant invention comprises alpha aluminum oxide hydroxide (AlOOH·x·$H_2O$) commonly referred to as boehmite, pseudoboehmite, and as aluminum monohydrate. In another exemplary aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities. Specific examples of commercially available dispersible alumina sources that can be used in the present invention include, without limitation, Dispal Boehmite, commercially available from CONDEA Vista Company of Houston, Tex., and Alpha Alumina A1000, commercially available from Almatis, Inc.

The titania source can in one aspect be a titanium dioxide composition, such as rutile titania, anatase titania, or a combination thereof. An exemplary commercially available titania source suitable for use in the instant invention is the Ti-Pure® titania, available from Dupont, Wilmington, Del., USA.

A silica source can include quartz, non-crystalline silica such as fused silica or sol-gel silica, silicone resin, zeolite, and diatomaceous silica, kaolin, and quartz. In one embodiment, the silica source is preferably selected from the group consisting of quartz and fused silica.

One of ordinary skill in the art will appreciate that the amount of the above-described raw inorganic batch components can be selected to yield a resulting aluminum titanate ceramic composition having the desired oxide components. To that end, the selection and/or determination of such amounts will be readily obtainable by one of ordinary skill in the art in view of the instant disclosure and without requiring undue experimentation and thus will not be discussed in detail herein. However, in exemplary aspect, these inorganic powdered raw materials are preferably selected in amounts that, in combination with the recycled aluminum titanate component, are suitable to provided a sintered phase aluminum titanate ceramic composition comprising, as characterized in an oxide weight percent basis, from about 8 to about 15 percent by weight $SiO_2$, from about 45 to about 53 percent by weight $Al_2O_3$, and from about 27 to about 33 percent by weight $TiO_2$. For example, an exemplary inorganic aluminum titanate precursor powder batch composition can comprises approximately 10% quartz; approximately 47% alumina; approximately 30% titania; and approximately 13% additional inorganic additives. Additional exemplary non-limiting inorganic batch component mixtures suitable for forming aluminum titanate include those disclosed in U.S. Pat. Nos. 4,483,944; 4,855,265; 5,290,739; 6,620,751; 6,942,713; 6,849,181; U.S. Patent Application Publication Nos.:2004/0020846; 2004/0092381; and in PCT Application Publication Nos.: WO 2006/015240; WO 2005/046840; and WO 2004/011386.

The inorganic powdered batch materials set forth above can then blended together with an optional sintering aid, a temporary organic binder, and a liquid vehicle to provide a resulting plasticized aluminum titanate precursor composition. The relative amounts of these forming aids can vary depending on factors such as the nature and amounts of raw materials used, etc.

The addition of the sintering aid can enhance the strength of the resulting ceramic material after firing, and is suitably present in proportions of about 0.1-0.5 percent by weight of the batch. Especially effective as sintering aids in these aluminum titanate compositions are the metal oxides of lanthanide series elements, particularly including lanthanum, yttrium and cerium oxides. Sintering aids may be added to the batch in powder and/or liquid forms.

The preferred liquid vehicle for providing a plasticized aluminum titanate precursor composition is water, although other liquid vehicles exhibiting solvent action with respect to suitable temporary binders can be used. To this end, the amount of the liquid vehicle component can vary in order to impart optimum handling properties and compatibility with the other components in the ceramic batch mixture. Typically, the liquid vehicle content is present as a super addition in an amount in the range of from 15% to 60% by weight of the plasticized composition, and more preferably in the range of from 20% to 50% by weight of the plasticized composition.

Suitable temporary binders for use in the batch compositions of the present invention include water soluble cellulose ether binders such as methylcellulose, hydroxypropyl methylcellulose, methylcellulose derivatives, and/or any combinations thereof. Particularly preferred examples include methyl cellulose and hydroxypropyl/methyl cellulose. Typically, the organic binder is present in the batch composition as a super addition in an amount in the range of from 0.1 weight percent to 5.0 weight percent of the aluminum titanate precursor batch composition, and more preferably, in an amount in the range of from 0.5 weight percent to 2.0 weight percent of the aluminum titanate precursor batch composition.

Still further, the inventive batch compositions can also optionally comprise at least one additional processing aid such as a plasticizer, lubricant, surfactant, and/or pore former. An exemplary plasticizer for use in preparing the ceramic precursor batch compositions is glycerine. An exemplary lubricant can be a hydrocarbon oil or tall oil. A pore former, may also be optionally used to optimize the porosity and median pore size of the resulting aluminum titanate ceramic material. Exemplary and non-limiting pore formers can include graphite, starch, polyethylene beads, and/or flour.

In use, the plasticized aluminum titanate precursor compositions of the present invention further provide a method for producing a ceramic article comprised of a sintered phase aluminum titanate. The method generally comprises providing a plasticized aluminum titanate precursor batch composition as described above, forming an extruded green body from the plasticized aluminum titanate precursor batch composition, and firing the formed green body under conditions effective to convert the aluminum titanate precursor composition into a ceramic composition comprising a sintered phase aluminum titanate.

The plasticized aluminum titanate precursor composition can be formed into a green body having any desired size and shape. The forming can be by any known conventional ceramic forming process, such as, e.g., extrusion, injection molding, slip casting, centrifugal casting, pressure casting, dry pressing, and the like. In an exemplary aspect, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

In one aspect, the instant method and the resulting ceramic structures are well suited for use as diesel particulate filters in exhaust gas treatment systems. To that end, the resulting ceramic bodies are especially suited as multi-cellular honeycomb structures having a high filter volumetric heat capacity, a low pressure drop between the entrance and exit faces of the filter, a low CTE, and a high filtration efficiency. Thus, in one aspect the plasticized ceramic precursor batch composition can be formed or otherwise shaped into a honeycomb configuration.

Although a honeycomb ceramic filter of the present invention normally has a structure in which a plurality of through holes opened to the end surface of the exhaust gas flow-in side and to the end surface of the exhaust gas flow-out side are alternately sealed at both the end surfaces, the shape of the honeycomb filter is not particularly restricted. For example, the filter may be a cylinder having end surfaces with a shape of a circle or an ellipse, a prism having the end surfaces with a shape of a polygon such as a triangle or a square, a shape in which the sides of these cylinder and prism are bent like an "doglegged shape," or the like. In addition, the shape of through holes is not particularly limited. For example, the sectional shape may be a polygon such as a square or an octagon, a circle, an ellipse, or the like.

Some examples of ceramic honeycombs produced by the process of the present invention generally comprise cell densities in the of range from 235 cells/cm$^2$ (about 1500 cells/in$^2$) to 15 cells/cm$^2$ (about 100 cells/in$^2$). Further, the wall or web thicknesses typically range from about 0.07 to about 0.6 mm (about 3 to about 25 mils). It should however be understood that the particular desired size and shape of the ceramic body can depend on the application, e.g., in automotive applications by engine size and space available for mounting, etc. To this end, although the ceramic articles of the instant invention are, in one aspect, suitable for preparing thin-walled honeycombs, the claimed mixtures can also be used for thicker walled structures. For example, honeycombs structures having about 15 to about 30 cells/cm$^2$ and (about 100 to about 200 cells/in$^2$) and wall thicknesses of about 0.30 to about 0.64 mm (about 12 to about 25 mil) are well suited for diesel particulate filter applications.

The formed green body having a desired size and shape as described above can then be dried to remove excess moisture. The drying step can be performed by hot air, microwave, steam, or dielectric drying, which can be followed by ambient air drying. Once dried, the green body can thereafter be fired under conditions effective to convert the green body into a ceramic article comprising a primary crystalline phase ceramic composition, as described below.

The firing conditions effective to convert the green body into a ceramic article can vary depending on the process conditions such as, for example, the specific composition, size of the green body, and nature of the equipment used. To that end, in one aspect the optimal firing conditions needed to obtain a ceramic article according to the instant invention will be obtainable by one of ordinary skill in the art through no more than mere routine experimentation. Thus, the present invention is not limited to specific firing temperatures and times. However, in one aspect, the firing temperatures can range from about 1400° C. to about 1600° C. In another aspect, the firing temperature can range from about 1450° C. to about 1550° C. Suitable firing times can also range from about 1 hour to about 10 hours.

EXAMPLES

To further illustrate the principles of the present invention, the following examples are put forth so as to provide those of ordinary skill in the art with a complete disclosure and description of how the ceramic articles and methods claimed herein can be made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C or is at ambient temperature, and pressure is at or near atmospheric.

Several inventive aluminum titanate precursor batch compositions were prepared comprising varying amounts of a recycled green aluminum titanate composition. In particular, twelve exemplary batch compositions were prepared comprising 5, 10, 25 and 50 weight percent of the recycled green aluminum titanate. Further, for each specified amount of recycled green aluminum titanate tested, three batch compositions were prepared comprising particulate green aluminum titanate having varying median particle size diameters of 25.5 μm, 47.3 μm, and 14.9 μm. The weight percentages of the batch components for the specific plasticized batch compositions are set forth in Table 1 below:

TABLE 1

Inventive Batch Compositions 1-12

| | Batch # | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Reuse ($d_{50}$) | 25.5 | 25.5 | 25.5 | 25.5 | 47.3 | 47.3 | 47.3 | 47.3 | 14.9 | 14.9 | 14.9 | 14.9 |
| Reuse (wt. %) | 5 | 10 | 25 | 50 | 5 | 10 | 25 | 50 | 5 | 10 | 25 | 50 |
| $SiO_2$ | 9.68 | 9.17 | 7.64 | 5.10 | 9.68 | 9.17 | 7.64 | 5.10 | 9.68 | 9.17 | 7.64 | 5.10 |
| $SrCO_3$ | 7.6 | 7.20 | 6.00 | 4.00 | 7.6 | 7.20 | 6.00 | 4.00 | 7.6 | 7.20 | 6.00 | 4.00 |
| $CaCO_3$ | 1.31 | 1.24 | 1.04 | 0.69 | 1.31 | 1.24 | 1.04 | 0.69 | 1.31 | 1.24 | 1.04 | 0.69 |
| $Al_2O_3$ | 44.25 | 41.91 | 34.93 | 23.28 | 44.25 | 41.91 | 34.93 | 23.28 | 44.25 | 41.91 | 34.93 | 23.28 |
| $TiO_2$ | 28.45 | 26.96 | 22.46 | 14.97 | 28.45 | 26.96 | 22.46 | 14.97 | 28.45 | 26.96 | 22.46 | 14.97 |
| $Al(OH)_3$ | 3.52 | 3.34 | 2.78 | 1.86 | 3.52 | 3.34 | 2.78 | 1.86 | 3.52 | 3.34 | 2.78 | 1.86 |
| $La_2O_3$ | 0.19 | 0.18 | 0.15 | 0.10 | 0.19 | 0.18 | 0.15 | 0.10 | 0.19 | 0.18 | 0.15 | 0.10 |
| Potato Starch | 9.5 | 9.00 | 7.5 | 5.00 | 9.5 | 9.00 | 7.5 | 5.00 | 9.5 | 9.00 | 7.5 | 5.00 |
| Graphite | 9.5 | 9.00 | 7.5 | 5.00 | 9.5 | 9.00 | 7.5 | 5.00 | 9.5 | 9.00 | 7.5 | 5.00 |
| Binder | 4.28 | 4.5 | 3.38 | 2.25 | 4.28 | 4.5 | 3.38 | 2.25 | 4.28 | 4.5 | 3.38 | 2.25 |
| Solvent | 17 | 18 | 17 | 16 | 18 | 18 | 18 | 18 | 18 | 18 | 18 | 18 |

In addition, several inventive aluminum titanate precursor batch compositions were prepared comprising varying amounts of a pre-reacted particulate refractory aluminum titanate composition. In particular, twelve exemplary batch compositions were prepared comprising 5, 10, 25 and 50 weight percent of the particulate pre-reacted aluminum titanate. Further, for each specified amount of particulate pre-reacted aluminum titanate tested, three batch compositions were also prepared comprising the pre-reacted aluminum titanate having varying median particle size diameters of 28.1 μm, 53.8 μm, and 9.3 μm. The weight percentages of the batch components for the specific plasticized batch compositions are set forth in Table 2 below:

TABLE 2

Inventive Batch Compositions 13-24

| | Batch # | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Reuse ($d_{50}$) | 28.1 | 28.1 | 28.1 | 28.1 | 53.8 | 53.8 | 53.8 | 53.9 | 9.3 | 9.3 | 9.3 | 9.3 |
| Reuse (wt. %) | 5 | 10 | 25 | 50 | 5 | 10 | 25 | 50 | 5 | 10 | 25 | 50 |
| $SiO_2$ | 9.68 | 9.17 | 7.64 | 5.10 | 9.68 | 9.17 | 7.64 | 5.10 | 9.68 | 9.17 | 7.64 | 5.10 |
| $SrCO_3$ | 7.6 | 7.20 | 6.00 | 4.00 | 7.6 | 7.20 | 6.00 | 4.00 | 7.6 | 7.20 | 6.00 | 4.00 |
| $CaCO_3$ | 1.31 | 1.24 | 1.04 | 0.69 | 1.31 | 1.24 | 1.04 | 0.69 | 1.31 | 1.24 | 1.04 | 0.69 |
| $Al_2O_3$ | 44.25 | 41.91 | 34.93 | 23.28 | 44.25 | 41.91 | 34.93 | 23.28 | 44.25 | 41.91 | 34.93 | 23.28 |

TABLE 2-continued

Inventive Batch Compositions 13-24

| | Batch # | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| $TiO_2$ | 28.45 | 26.96 | 22.46 | 14.97 | 28.45 | 26.96 | 22.46 | 14.97 | 28.45 | 26.96 | 22.46 | 14.97 |
| $Al(OH)_3$ | 3.52 | 3.34 | 2.78 | 1.86 | 3.52 | 3.34 | 2.78 | 1.86 | 3.52 | 3.34 | 2.78 | 1.86 |
| $La_2O_3$ | 0.19 | 0.18 | 0.15 | 0.10 | 0.19 | 0.18 | 0.15 | 0.10 | 0.19 | 0.18 | 0.15 | 0.10 |
| Potato Starch | 10.0 | 10.0 | 10.0 | 10.0 | 10.0 | 10.0 | 10.0 | 10.0 | 10.0 | 10.0 | 10.0 | 10.0 |
| Graphite | 10.0 | 10.0 | 10.0 | 10.0 | 10.0 | 10.0 | 10.0 | 10.0 | 10.0 | 10.0 | 10.0 | 10.0 |
| Binder | 4.5 | 4.5 | 4.5 | 4.5 | 4.5 | 4.5 | 4.5 | 4.5 | 4.5 | 4.5 | 4.5 | 4.5 |
| Solvent | 19 | 19 | 19 | 20 | 17 | 17 | 20 | 18 | 18.5 | 18.5 | 18.5 | 18 |

Inventive batch compositions 1-4 and 13-16 were subsequently extruded to form cylindrical green honeycomb bodies of 2-inch diameter, having cell densities of 300 cells/in$^2$ of honeycomb diameter and cell wall thicknesses of 0.013 inches. The resulting green bodies were then dried and fired at a firing temperature of approximately 1450° C. for a period of approximately 8 hours. After firing, the resulting aluminum titanate ceramic articles were evaluated for several physical properties, including coefficient of thermal expansion, total porosity, median pore size and strength. The results of the evaluation are set forth in Table 3 below.

TABLE 3

Measured Physical Properties of Exemplary Ceramic Articles

| | Fired Sample | | | | | | | |
|---|---|---|---|---|---|---|---|---|
| | A | B | C | D | E | F | G | H |
| Batch # | 1 | 2 | 3 | 4 | 13 | 14 | 15 | 16 |
| CTE @ 800° C. | 1.0 | 0.3 | 0.0 | 1.7 | 4.1 | 5.2 | 4.2 | 5.2 |
| CTE @ 1000° C. | 5.3 | 4.5 | 4.1 | 5.5 | 8.2 | 9.3 | 8.5 | 9.6 |
| Porosity % P | 50.4 | 50.6 | 50.4 | 49.3 | 51.6 | 50.5 | 48.5 | 42.2 |
| MPS | 17.9 | 18.2 | 17.6 | 15.6 | 17.5 | 17.5 | 15.3 | 15.0 |
| Strength - psi | 177 | 180 | 182 | 202 | 201 | 216 | 244 | 320 |

While the foregoing descriptions and examples of the invention provide an enabling teaching of the invention in its best currently known embodiments, it will be recognized and appreciated that those descriptions are illustrative only, and that many changes can be made to those various embodiments while still retaining the beneficial results of the present invention as it will be practiced within the scope of the appended claims.

We claim:

1. A method for producing a ceramic article comprised of a sintered phase aluminum titanate composition, comprising the steps of:
    providing a plasticized aluminum titanate precursor batch composition comprising:
        an inorganic batch composition containing an alumina source, a silica source, and a titania source; a recycled green aluminum titanate precursor composition; and a sintering aid;
        an organic binder; and
        a liquid vehicle;
        wherein the recycled green aluminum titanate precursor composition comprises at least one pore former; and
        wherein the recycled green aluminum titanate precursor composition comprises particles having a median particle diameter in the range of about 10 μm to about 50 μm;
    forming an extruded green body from the plasticized aluminum titanate precursor batch composition; and
    firing the formed green body under conditions effective to convert the aluminum titanate precursor composition into a ceramic composition comprising a sintered phase aluminum titanate.

2. The method of claim 1, wherein the inorganic batch composition comprises green aluminum titanate precursor composition in an amount up to 50 weight percent of the inorganic batch composition.

3. The method of claim 2, wherein the green aluminum titanate precursor composition is present in an amount of from 1 to 50 weight percent of the inorganic batch composition.

4. The method of claim 1, wherein the plasticized aluminum titanate precursor batch composition further comprises at least one pore former.

5. The method of claim 1, wherein the inorganic batch composition comprises at least one metal oxide sintering aid.

6. The method of claim 5, wherein the metal oxide sintering aid comprises at least one lanthanide oxide source.

7. The method of claim 1, wherein the inorganic batch composition further comprises a strontium carbonate source and a calcium carbonate source.

8. The method of claim 7, wherein the inorganic batch composition comprises about 47 wt % alumina source, about 10 wt % silica source, about 10 wt % titania source, and about 13 wt % additional inorganic additives, inclusive of the recycled pre-reacted aluminum titanate ceramic composition.

9. A method for producing a ceramic article comprised of a sintered phase aluminum titanate composition, comprising the steps of:
    providing a plasticized aluminum titanate precursor batch composition comprising:
        an inorganic batch composition containing a recycled green aluminum titanate precursor composition;
        an organic binder; and
        a liquid vehicle;
        wherein the recycled green aluminum titanate precursor composition comprises at least one pore former; and
        wherein the recycled green aluminum titanate precursor composition comprises particles having a median particle diameter in the range of about 10 μm to about 50 μm;
    forming an extruded green body from the plasticized aluminum titanate precursor batch composition; and
    firing the formed green body under conditions effective to convert the aluminum titanate precursor composition into a ceramic composition comprising a sintered phase aluminum titanate.

10. The method of claim 9, wherein the inorganic batch composition further comprises at least one pore former.

11. The method of claim 9, wherein the inorganic batch composition further comprises at least one pore former and/or at least one sintering aid.

12. The method of claim 9, wherein the inorganic batch composition consists essentially of 100% by weight of a green aluminum titanate precursor composition.

13. A method for producing a ceramic article comprised of a sintered phase aluminum titanate composition, comprising the steps of:
   providing a plasticized aluminum titanate precursor batch composition comprising:
      an inorganic batch composition containing an alumina source, a silica source, and a titania source; a recycled pre-reacted aluminum titanate composition containing a strontium carbonate source and a calcium carbonate source; and a sintering aid;
      an organic binder; and
      a liquid vehicle;
      wherein the recycled pre-reacted aluminum titanate composition comprises particles having a median particle diameter in the range of about 8 μm to about 55 μm;
   forming an extruded green body from the plasticized aluminum titanate precursor batch composition; and
   firing the formed green body under conditions effective to convert the aluminum titanate precursor composition into a ceramic composition comprising a sintered phase aluminum titanate.

14. The method of claim 13, wherein the inorganic batch composition comprises recycled pre-reacted aluminum titanate in an amount up to 25 weight percent of the inorganic batch composition.

15. The method of claim 14, wherein the recycled pre-reacted aluminum titanate is present in an amount of from 1 to 25 weight percent of the inorganic batch composition.

16. The method of claim 13, wherein the plasticized aluminum titanate precursor batch composition further comprises a pore former.

17. The method of claim 16, wherein the inorganic batch composition further comprises at least one pore former.

18. The method of claim 13, wherein the inorganic batch composition comprises at least one metal oxide sintering aid.

19. The method of claim 18, wherein the metal oxide sintering aid comprises at least one lanthanide oxide source.

20. A method for producing a ceramic article comprised of a sintered phase aluminum titanate composition, comprising the steps of:
   providing a plasticized aluminum titanate precursor batch composition comprising:
      an inorganic batch composition containing a recycled pre-reacted aluminum titanate composition containing a strontium carbonate source and a calcium carbonate source;
      an organic binder; and
      a liquid vehicle;
      wherein the recycled pre-reacted aluminum titanate composition comprises particles having a median particle diameter in the range of about 8 μm to about 55 μm;
   forming an extruded green body from the plasticized aluminum titanate precursor batch composition; and
   firing the formed green body under conditions effective to convert the aluminum titanate precursor composition into a ceramic composition comprising a sintered phase aluminum titanate.

21. The method of claim 20, wherein the inorganic batch composition further comprises at least one pore former and/or at least one sintering aid.

22. The method of claim 20, wherein the inorganic batch composition consists essentially of 100% by weight of a recycled pre-reacted aluminum titanate composition.

* * * * *